United States Patent
Maniere et al.

(10) Patent No.: US 10,641,289 B2
(45) Date of Patent: May 5, 2020

(54) AIRFLOW STRAIGHTENING ASSEMBLY HAVING IMPROVED AERODYNAMIC PERFORMANCES

(71) Applicant: SAFRAN AIRCRAFT ENGINES, Paris (FR)

(72) Inventors: Vianney Christophe Marie Maniere, Moissy-Cramayel (FR); Henri-Marie Damevin, Moissy-Cramayel (FR); Philippe Jacques Pierre Fessou, Moissy-Cramayel (FR); Sebastien Nicolas Jiugne, Moissy-Cramayel (FR); Michael Franck Antoine Schvallinger, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 15 days.

(21) Appl. No.: 15/748,165

(22) PCT Filed: Jul. 29, 2016

(86) PCT No.: PCT/FR2016/051990
§ 371 (c)(1),
(2) Date: Jan. 26, 2018

(87) PCT Pub. No.: WO2017/017392
PCT Pub. Date: Feb. 2, 2017

(65) Prior Publication Data
US 2018/0231025 A1   Aug. 16, 2018

(30) Foreign Application Priority Data
Jul. 29, 2015 (FR) .................................. 15 57262

(51) Int. Cl.
*F04D 29/54* (2006.01)
*F02C 7/32* (2006.01)
(Continued)

(52) U.S. Cl.
CPC .......... *F04D 29/544* (2013.01); *F01D 5/143* (2013.01); *F01D 9/065* (2013.01); *F02C 7/32* (2013.01);
(Continued)

(58) Field of Classification Search
None
See application file for complete search history.

(56) References Cited

U.S. PATENT DOCUMENTS 9,068,460 B2 * 6/2015 Suciu ...................... F01D 1/04
2012/0093642 A1   4/2012 Nilsson et al.
2013/0259672 A1  10/2013 Suciu et al.

FOREIGN PATENT DOCUMENTS

EP   2878796 A1   6/2015
FR   3010154 A1   3/2015
(Continued)

OTHER PUBLICATIONS

Preliminary Research Report received for French Application No. 1557262, dated Jun. 16, 2016, 3 pages (1 page of French Translation Cover Sheet and 2 pages of original document).
(Continued)

*Primary Examiner* — Igor Kershteyn
*Assistant Examiner* — Jason G Davis
(74) *Attorney, Agent, or Firm* — Womble Bond Dickinson (US) LLP

(57) ABSTRACT

The proposed invention is an airflow straightening assembly for a turbine engine comprising: —a cylindrical platform (15) centered on an axis (X-X), —at least one straightener blade (20) extending from the platform, —a structural unit (30) extending radially relative to the axis, and —a mechanical member (40) protruding from the platform (15), said mechanical member (40) being one of the group comprising: —a radial shaft, —an angle transmission box of a radial (Continued)

shaft, —an electric, hydraulic or pneumatic connection element, —an intermediate gear driving a radial shaft, the straightening assembly further comprising a fairing (50) or the protruding mechanical member, the fairing having a three-dimensional surface defined by: —at least one upstream end point ($A_i$, $A_e$) located axially upstream from the mechanical member (40) relative to the direction of air flow in the turbine engine, and —at least one downstream end point ($C_i$, $C_e$) located axially downstream from the mechanical member, the three-dimensional surface being tangential to the platform at the upstream and downstream end points ($A_i$, $A_e$, $C_i$, $C_e$), and having a larger cross-section measured along an axis (Y-Y) orthogonal to the first, and in which the three-dimensional surface is further defined by two lateral end point ($B_i$, $B_e$) corresponding to the ends of said larger cross-section respectively on the pressure side and suction side of the structural arm (30), the axial positions or said points being separated by at most 0.1 $C_{OGV}$—in which $C_{OGV}$ is the chord of the straightener blade (20).

10 Claims, 4 Drawing Sheets

(51) Int. Cl.
*F01D 5/14* (2006.01)
*F01D 9/06* (2006.01)

(52) U.S. Cl.
CPC .......... *F01D 5/145* (2013.01); *F05D 2220/36* (2013.01); *F05D 2250/322* (2013.01); *Y02T 50/673* (2013.01)

(56) References Cited

FOREIGN PATENT DOCUMENTS

WO 2014/018137 A2 1/2014
WO 2017/017392 A1 2/2017

OTHER PUBLICATIONS

International Search Report and Written Opinion received for PCT Patent Application No. PCT/FR2016/051990, dated Nov. 28, 2016, 22 pages (10 pages of English Translation and 12 pages of Original Document).

International Preliminary Report on Patentability received for PCT Patent Application No. PCT/FR2016/051990, dated Feb. 8, 2018, 17 pages (9 pages of English Translation and 8 pages of Original Document).

\* cited by examiner

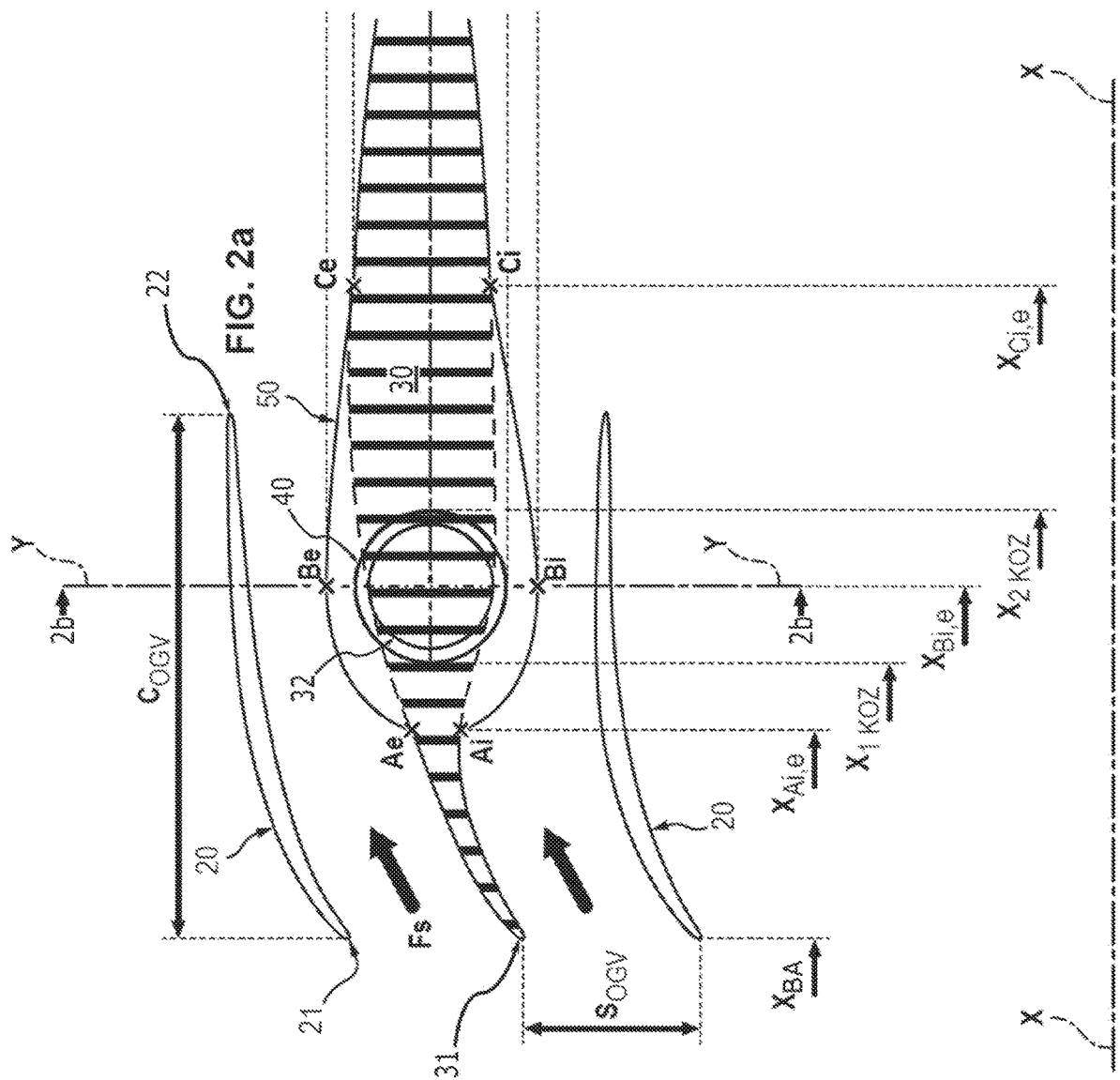

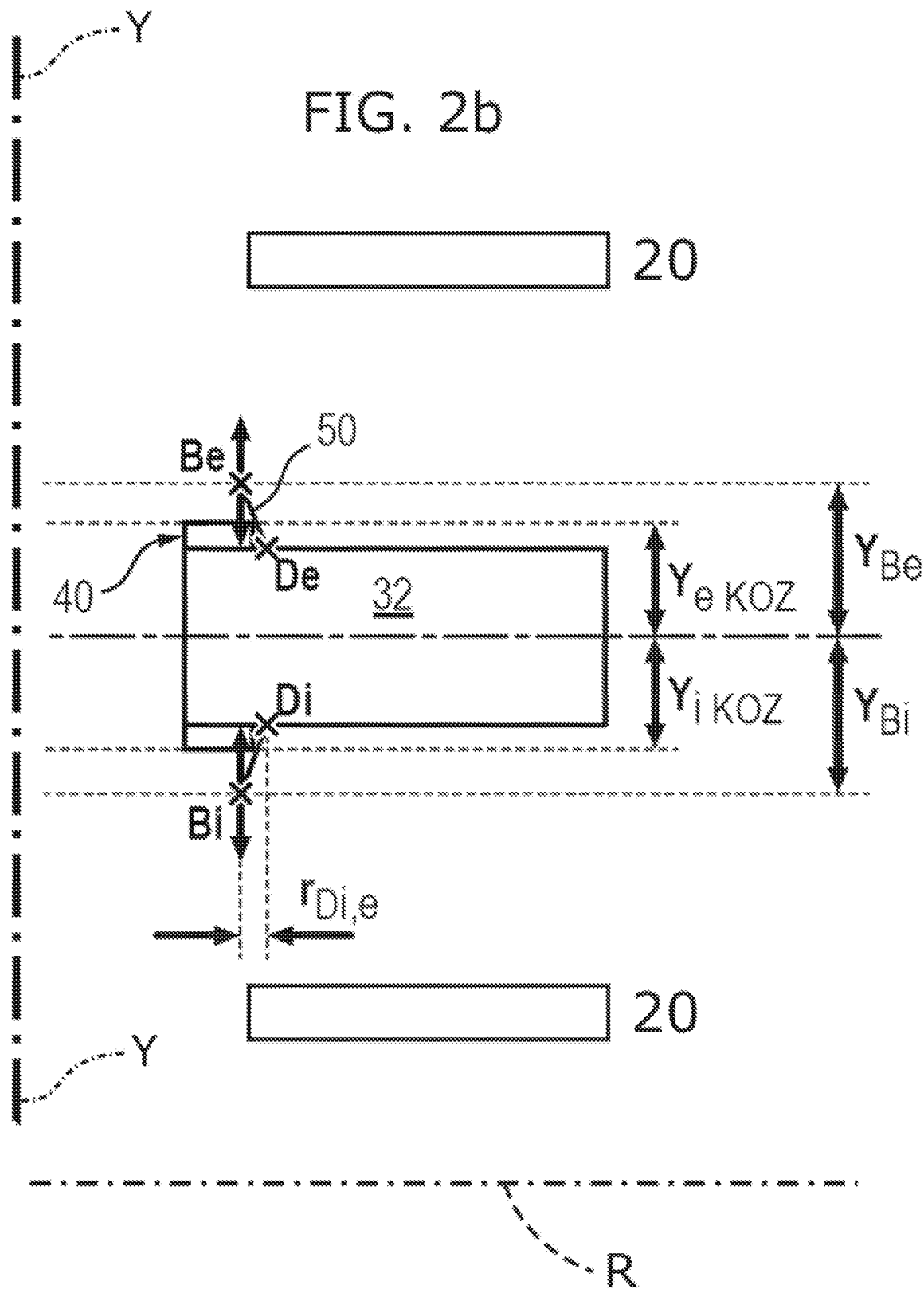

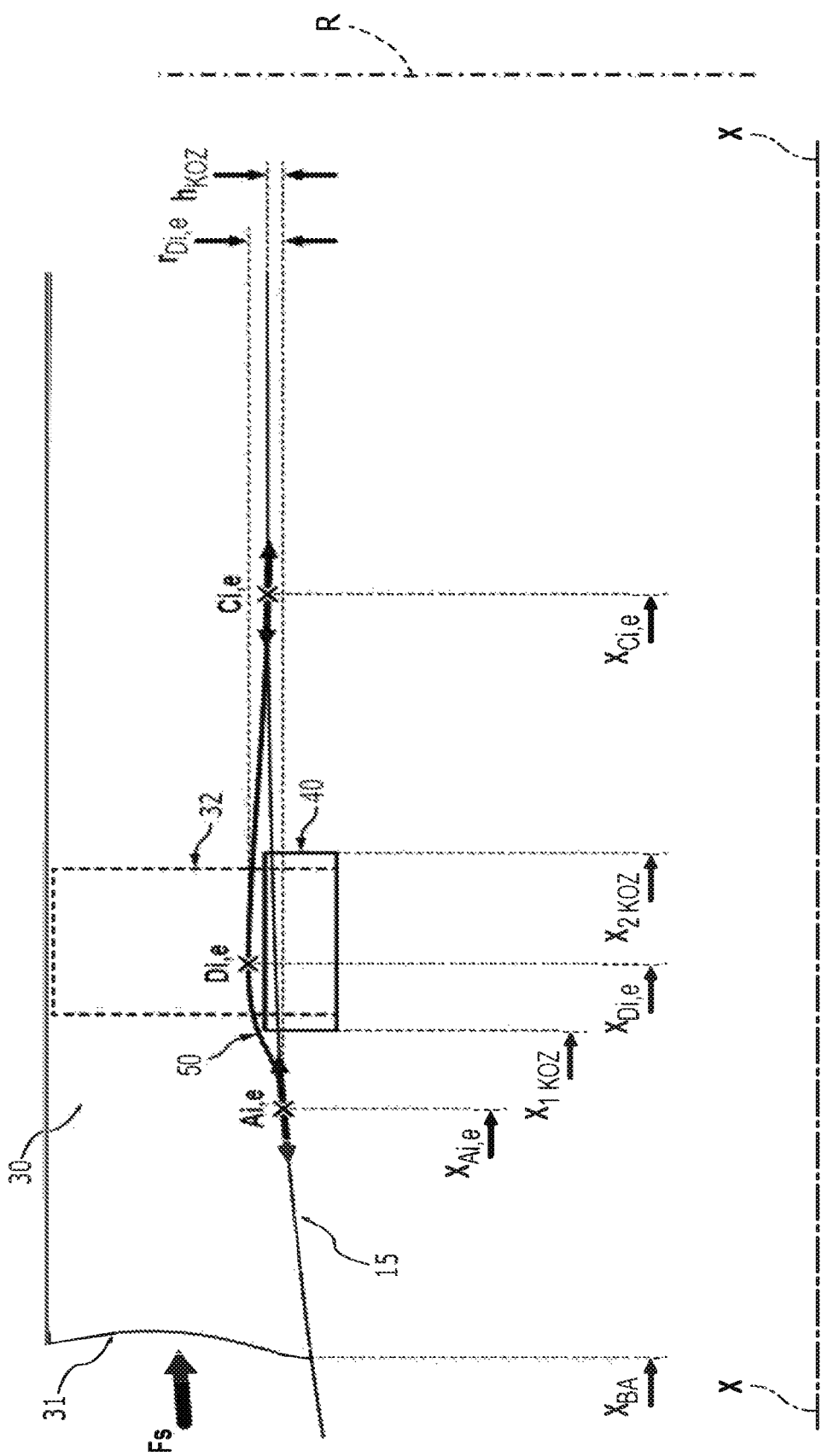

AIRFLOW STRAIGHTENING ASSEMBLY HAVING IMPROVED AERODYNAMIC PERFORMANCES

FIELD OF THE INVENTION

The invention relates to a turbine engine flow straightening assembly, and a turbine engine comprising such an assembly. The invention applies particularly to turbine engines of the double flow type.

PRIOR ART

A double flow turbine engine for aeronautical propulsion is shown in FIG. 1. It comprises a fan 10 delivering a flow of air of which a central portion, called the primary flow $F_P$, is injected into a compressor 12 which feeds a turbine 14 driving the fan.

The peripheral portion, called the secondary flow FS, of the air flow is for its part injected into the atmosphere to supply the major portion of the thrust of the turbine engine 1, after having passed through a fixed blade assembly 20 disposed downstream of the fan. This assembly, called a straightener 20 (also known by the acronym OGV for "outlet guide vane"), allows the secondary air flow to be straightened at the outlet of the fan, while still limiting losses as much as possible.

Shown on the same figure is a structural arm 30, which connects the external collar of the intermediate casing to the internal collar of the intermediate casing, thus contributing to supporting and maintaining in position the engine shaft(s) and ensuring the structural resistance of the assembly. The structural arms also have the function of allowing the transmission of movement or of fluids between the turbine engine and the rest of the aircraft on which it is mounted. To this end, the structural arms are hollow, and allow the accommodation of pipes, transmission shafts, etc.

In order to improve the aerodynamic performance of a double flow turbine engine, it is desired to increase the bypass ratio of the turbine engine, i.e. the ratio between the flow rate in the secondary stream and the flow rate in the primary stream.

Now the presence of the structural arm 30 and other intruding mechanical members protruding into the secondary stream perturb the flow of air in the secondary stream and limit the improvement of the bypass ratio.

In fact, the outer diameter of the turbine engine is constrained by the integration of the totality of the elements under the wing of the airplane to which the turbine engine is attached, while still maintaining sufficient clearance between the bottom of the turbine engine once suspended under the wing and the ground (particularly sufficient clearance to pass over the lights installed on the takeoff and landing runways). For this reason, certain members sometimes protrude into the secondary stream.

The structural arm being frequently the accommodation of a radial transmission shaft, the protruding members inside the secondary stream can comprise, at one end of this arm, an angle transmission gearbox (or TGB for Transfer Gear-Box) or an intermediate gear transmission for driving the radial shaft (or IGB for Intermediary GearBox).

It is therefore necessary to compensate for the detrimental aerodynamic consequences of these problems of integrating mechanical elements.

DESCRIPTION OF THE INVENTION

The invention therefore has as its aim to propose a turbine engine air-flow straightening assembly, particularly for double flow turbine engines, having improved aerodynamics.

In this regard, the invention has as its object a turbine engine air-flow straightening assembly comprising:
- a cylindrical platform centered on an axis,
- at least one straightener blade extending from the platform, and
- a mechanical member protruding from the platform, the straightening assembly being characterized in that it further comprises a fairing of the protruding mechanical member, the fairing having a three-dimensional surface defined by:
- at least one upstream end point located axially upstream of the mechanical member with respect to the air flow direction in the turbine engine, and
- at least one downstream end point located axially downstream of the mechanical member, the three-dimensional surface being tangent to the platform at the upstream and downstream end points.

Advantageously, but optionally, the assembly according to the invention can further comprise at least one of the following features:
- the straightener blade comprises a leading edge, and the axial position of each upstream end point of the three-dimensional surface is defined by:

$$x_{BA}+0.25c_{OGV} \leq x_A \leq x_{1KOZ}$$

where $x_A$ is the axial position of the upstream end point of the three-dimensional surface, $x_{BA}$ is the axial position of the leading edge of the straightener blade, $c_{OGV}$ is the chord of the straightener blade, and $x_{1KOZ}$ is the axial position of the upstream end of the mechanical member.
- the three-dimensional surface is further defined by at least one maximum-height point with respect to the platform vertically above a maximum-height point of the mechanical member with respect to the platform, and the three-dimensional surface has, between this point and a downstream end point, a slope of less than 30%.
- The assembly can further comprise a structural arm extending radially with respect to the axis, and the three-dimensional surface of the fairing can be defined by an upstream end point on the pressure side of the structural arm, and an upstream end point on the suction side, said points having axial positions distant by $0.1c_{OGV}$ at most.
- The assembly can further comprise a structural arm extending radially with respect to the axis, and the three-dimensional surface of the fairing can be defined by a downstream end point on the pressure side of the structural arm, and a downstream end point on the suction side, said points having axial positions distant by $0.1c_{OGV}$ at most.
- The assembly can further comprise a structural arm extending radially with respect to the axis, in which the three-dimensional surface of the fairing has a larger section measured along an axis orthogonal to the first, and the surface is further defined by two lateral extreme points corresponding to the ends of said larger section respectively of the pressure and suction side of the structural arm (30), the axial positions of said points being distant by $0.1c_{OGV}$ at most.
- The three-dimensional surface can further be defined by a maximum-height point with respect to the platform on the pressure side of the structural arm, and the axial positions of the lateral extreme points and the maximum-height points are distant by $0.1c_{OGV}$ at most.

the three-dimensional surface of the fairing can be tangent to the platform at the lateral extreme points.

The protruding mechanical member can be one of the group comprising:
a radial shaft,
an angle transmission gearbox of a radial shaft,
an electrical, hydraulic or pneumatic connection element,
intermediate gear transmission of a radial shaft.

The invention also has as its object a turbine engine, comprising an air-flow straightening assembly according to the preceding description.

The proposed fairing allows, by covering in the mechanical members protruding into the air flow stream, while still offering tangency continuity between the surface of the fairing and the support platform of the straightener blades and of the structural arm, limiting the perturbations of the air flow in the stream.

The application of such an assembly to a double flow turbine engine therefore allows a better bypass ratio.

The fact of proposing a limited slope on the downstream side of the fairing also allows the occurrence of aerodynamic separation to be limited.

Finally, the fairing extends from at least a quarter of the chord of the straightener blade to limit the blockage of the stream as well as the propagation of distortion of static pressure.

DESCRIPTION OF THE FIGURES

Other features and advantages of the present invention will appear upon reading the description that follows of a preferred embodiment. This description will be given with reference to the appended drawings in which:

FIG. 2a shows a top unfolded view of an air-flow straightening assembly according to one embodiment of the invention, FIG. 2b shows a transverse section view of an air-flow straightening assembly according to a section plane identified in FIG. 2a, FIG. 2c shows a view of an air-flow straightening assembly from the pressure side of the structural arm.

DETAILED DESCRIPTION OF AT LEAST ONE EMBODIMENT OF THE INVENTION

Figure 1:
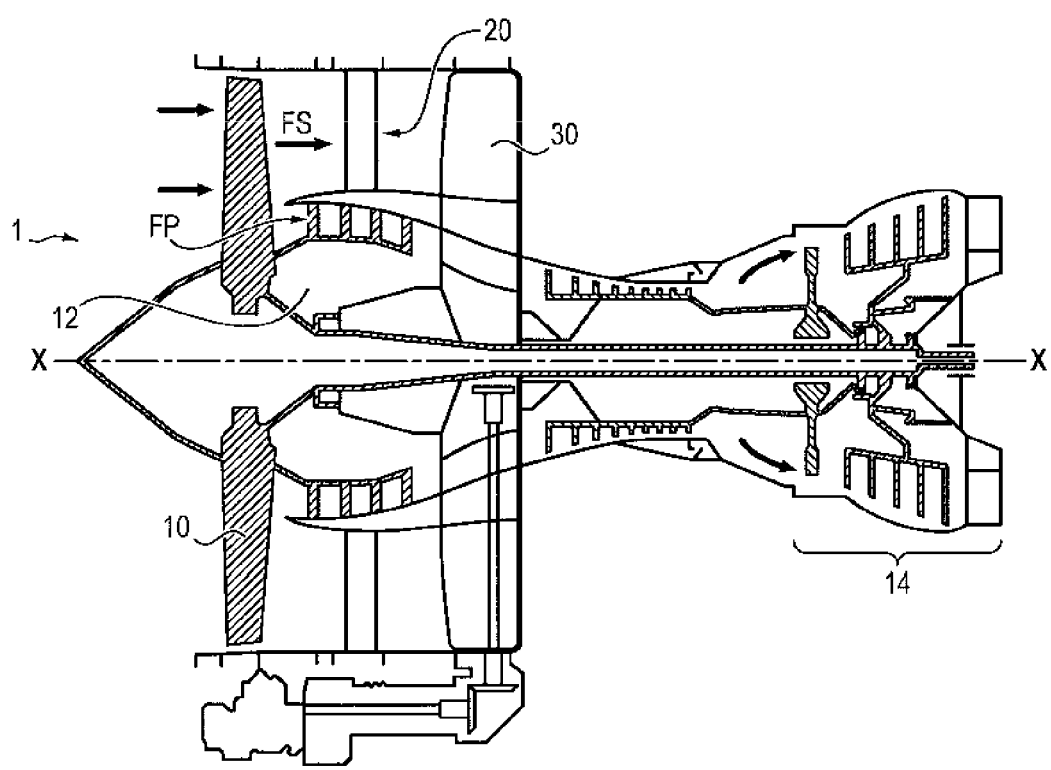
FIG. 1, previously described, shows an example of a turbine engine.

Referring to FIGS. 2a to 2c, an air-flow straightening assembly for a double flow turbine engine is shown. This assembly includes a platform 15 which consists of an internal or external collar for supporting secondary flow $F_S$ straightener blades 20 for the air flowing in the turbine engine. The straightener blades 20 can also be called by the acronym OGV for Outlet Guide Vane.

The platform 15 is therefore a collar centered on an axis X-X, this axis being the main axis of the turbine engine.

The assembly also includes at least one straightener blade 20 extending from the platform, radially around the axis X-X, FIG. 2a being a developed view of an angular sector covered by two straightener blades 20 extending on either side of a structural arm.

The straightener blade 20 includes a leading edge 21, the axial position of which is denoted $x_{BA}$, a trailing edge 22, and a chord $c_{OGV}$, which is the distance, measured in the direction of the axis X-X, between the leading edge 21 and the trailing edge 22.

In addition, the assembly comprises a structural arm 30.

The structural arm is advantageously, but without limitation, of the "integrated straightener blade" type, i.e. it comprises an upstream end portion 31 having the profile of a straightener blade. This is the case in the example shown in FIG. 2a.

The structural arm 30 also comprises a hollow zone 32 called forbidden by design (or KOZ for Keep-Out Zone) which is an accommodation dedicated to the installation of mechanical elements necessary to the operation of the turbine engine such as utilities, and particular for accommodating pipes, for example for oil or fuel, mechanical connections, one or more transmission shafts, etc.

The assembly also comprises a mechanical member 40 protruding into the air flow stream from the platform 15. This mechanical member is located at one end of the structural arm 30 and, for reasons of integration indicated in the introduction, emerges in the interior of the stream.

The mechanical member 40 can comprise, in the case where the structural arm 30 accommodates a radial transmission shaft, one end of this shaft, an angle transmission gearbox of this shaft (or Transfer Gear Box) or an intermediate gear transmission for driving this shaft (or Intermediary Gearbox). In the case where the structural arm 30 accommodates utilities, the mechanical member 40 can also or alternatively comprise electrical, hydraulic (oil or kerosene pipes) or pneumatic connection elements.

The assembly also comprises a fairing 50 of the protruding mechanical member, i.e. a wall covering this member by presenting an aerodynamic shape limiting the perturbations of the air flow flowing in the stream.

In this regard, the fairing has a three-dimensional surface; the geometry of which depends on that of the mechanical member 40.

The mechanical member 40 is parameterized by:

The axial position of its upstream end $x_{1KOZ}$, which is downstream of the leading edge 21 of the straightener blade 20: $x_{1KOZ} \geq x_{BA}$ The axial position of its downstream end: $x_{2KOZ}$, which is downstream of the upstream end: $x_{2KOZ} \geq x_{1KOZ}$ The maximum height of the member $h_{KOZ}$, i.e. the maximum radial distance of the mechanical member with respect to the axis X-X, and The greatest width which it occupies in a plane orthogonal to the axis X-X. As can be seen in FIG. 2b, this width is parameterized by the positions $y_{eKOZ}$ and $y_{iKOZ}$, on an axis Y-Y orthogonal to the axis X-X and orthogonal to a radial axis R around X (Y-Y is therefore tangential to a circle centered on the axis X-X), from the ends of this width respectively on the suction side and on the pressure side of the structural arm 30. The positions $y_{eKOZ}$ and $y_{iKOZ}$ on the axis Y-Y are measured with respect to an origin taken in the middle of the zone forbidden by design 32.

Then the three-dimensional surface of the fairing 50 is also parameterized by a set of points.

$A_i$ and $A_e$ denote the upstream end points with respect to the air flow of the three-dimensional surface of the fairing 50, respectively on the pressure side and on the suction side of the structural arm 30.

The upstream end points $A_i$ and $A_e$ are preferably aligned axially but a clearance is allowed such that their axial positions are distant by at most a tenth of the chord of the straightener blade:

$$x_{Ai} = x_{Ae} \pm 0.1 c_{OGV}$$

In order to cover the mechanical member 40, each upstream end point is located upstream of the upstream end of the mechanical member 40:

$$x_{Ai,e} < x_{1KOZ}$$

Moreover, as shown in FIG. 2c, the three-dimensional surface of the fairing 50 is advantageously tangent to the platform 15 at the upstream end points $A_i$ and $A_e$. In fact, the result is continuity between the surface of the platform and that of the fairing which limits the perturbations in the flow of air and maintains good aerodynamic performance.

Moreover, so as not to perturb the flow of air at the inlet of the stream, the axial position of each upstream end point is advantageously distant from the leading edge 21 of the straightener blades 20 by at least a quarter of the chord of the blade:

$$x_{BA} + 0.25 c_{OGV} \leq x_{Ai,e} < x_{1KOZ}$$

Denoted $C_i$ and $C_e$ are the downstream end points with respect to the air flow of the three-dimensional surface of the fairing 50, respectively on the pressure side and the suction side of the structural arm.

The downstream end points Ci and Ce are preferably aligned axially, but a clearance is allowed such that their axial positions are distant by at least a tenth of the chord from the straightener blade:

$$x_{Ci} = x_{Ce} \pm 0.1 c_{OGV}$$

In order to cover the mechanical member 40, each downstream end point of the surface of the fairing 50 is located downstream of the downstream end of the mechanical member 40:

$$x_{2KOZ} \leq x_{Ci,e}$$

Moreover, as shown in FIG. 2c, the three-dimensional surface of the fairing 50 is also tangent to the platform 15 at the downstream end points $C_i$ and $C_e$, to limit the perturbations of the air flow in the stream.

The three-dimensional surface of the fairing 50 is also parameterized by two maximum-height points $D_i$, $D_e$ measured radially with respect to the axis X-X, respectively on the pressure side and on the suction side of the structural arm. The radial distance of these points with respect to the axis is denoted respectively $r_{Di}$ and $r_{De}$, and $x_{Di}$ and $x_{De}$ their axial positions. The maximum-height points $D_i$, $D_e$ have the same axial position as the maximum-height point $h_{KOZ}$ of the mechanical member 40.

In order for the three-dimensional surface to cover the mechanical member 40, we have:

$$r_{Di,e} \geq h_{KOZ}$$

However, to limit the blockage of the fairing in the stream, the heights of the points Di, De are as small as possible. Advantageously, we have:

$$1.25 h_{KOZ} \geq r_{Di,e} \geq h_{KOZ}$$

The points $D_i$, $D_e$ are advantageously aligned axially, within a tenth of the chord of the straightener blade 20:

$$x_{Di} = x_{De} \pm 0.1 c_{OGV}$$

Advantageously, the axial position of the downstream end points is adapted to that of the maximum-height points to limit the slope of the three-dimensional surface to less than 30%. The minimization of the slope allows reducing unfavorable pressure gradients and minimizing flow separation.

Finally, the three-dimensional surface is parameterized by two lateral extreme points $B_i$, $B_e$. These points correspond to the ends of the largest cross-section of the mechanical member 40 measured along the axis Y-Y. The axial positions of these point are denoted $x_{Bi}$ and $x_{Be}$, and $y_{Bi}$ and $y_{Be}$ their position along the axis Y-Y with respect to the center of the prohibited by design zone 32.

In order for the three-dimensional surface to cover the mechanical member 40, we have:

$$y_{Bi} \geq y_{iKOZ}$$

$$y_{Be} \geq y_{eKOZ}$$

However, the maximum blockage along the axis Y-Y, and therefore the positions $y_{Bi}$ and $y_{Be}$, are constrained by the width $s_{OGV}$ of the channel between the structural arm 30 and the adjoining straightener blade 20: $y_{Bi,e} \leq s_{OGV}$.

The points $B_i$, $B_e$ are advantageously aligned axially, within a tenth of the chord of the straightener blade 20:

$$x_{Bi} = x_{Be} \pm 0.1 c_{OGV}$$

As can be seen in FIG. 2b, the three-dimensional surface of the fairing 50 is advantageously tangent to the platform 15 at points $B_i$ and $B_e$, to limit the perturbations of the air flow in the stream.

Moreover, the axial positions of the lateral extreme points and of the maximum-height points are advantageously distant by a tenth of the chord of the straightener blade 20 at most.

The parameterization indicated previously therefore allows the aerodynamic performance of the secondary stream of a double flow turbine engine to be preserved, and therefore to improve the bypass ratio, without impacting the ground clearance of the aircraft on which the turbine engine is installed.

The invention claimed is:

1. A turbine engine air-flow straightening assembly comprising:
   a cylindrical platform centered on an axis X-X,
   at least one straightener blade extending from the cylindrical platform,
   a structural arm extending radially with respect to the axis, and
   a mechanical member protruding from the cylindrical platform, said mechanical member being one of the group consisting of:
   a radial shaft,
   an angle transmission gearbox of a radial shaft,
   a pipe,
   intermediate gear transmission of a radial shaft,
   wherein the straightening assembly further comprises a fairing of the protruding mechanical member, the fairing having a three-dimensional surface defined by:
   at least one upstream end point located axially upstream of the mechanical member with respect to the air flow direction in the turbine engine, and
   at least one downstream end point located axially downstream of the mechanical member,
   the three-dimensional surface being tangent to the cylindrical platform at the at least one upstream end point at the at least one downstream end point, and having a larger section measured along an axis Y-Y orthogonal to the axis X-X and tangential to a circle centered on the axis X-X,
   and wherein the three-dimensional surface is further defined by two lateral extreme points corresponding to ends of said larger section respectively on a pressure side and on a suction side of the structural arm, the axial positions of said lateral extreme points being distant from each other by $0.1 c_{OGV}$ at most, where $c_{OGV}$ is a chord of the at least one straightener blade.

2. The air-flow straightener assembly according to claim 1, wherein the at least one straightener blade comprises a leading edge, and each upstream end point of the three-dimensional surface is located downstream of the leading edge of the at least one straightener blade and upstream of the upstream end of the mechanical member, the axial position of each upstream end point being distant from the axial position of the leading edge of the at least one straightener blade by at least a quarter of a chord of the at least one straightener blade.

3. The air-flow straightener assembly according to claim 1, wherein the three-dimensional surface is further defined by at least one maximum-height point with respect to the cylindrical platform vertically above a maximum-height point of the mechanical member with respect to the cylindrical platform, and the three-dimensional surface has, between the at least one maximum-height point with respect to the cylindrical platform and one of the at least one downstream end point, a slope of less than 30%.

4. The air-flow straightener assembly according to claim 1, wherein the at least one upstream end point comprises an upstream end point on the pressure side of the structural arm, and an upstream end point on the suction side of the structural arm, the upstream end point on the pressure side and the upstream end point on the suction side having axial positions distant from each other by $0.1c_{OGV}$ at most.

5. The air-flow straightener assembly according to claim 1, wherein the at least one downstream end point comprises a downstream end point on the pressure side of the structural arm, and a downstream end point on the suction side of the structural arm, the downstream end point on the pressure side and the downstream end point on the pressure side having axial positions distant from each other by $0.1c_{OGV}$ at most.

6. The air-flow straightener assembly according to claim 1, wherein the three-dimensional surface is further defined by a maximum-height point with respect to the cylindrical platform on the pressure side of the structural arm and a maximum-height point with respect to the cylindrical platform on the suction side of the structural arm, and the distance between the axial positions of one of the lateral extreme points and one of the maximum-height points is $0.1c_{OGV}$ at most.

7. The air-flow straightener assembly according to claim 1, wherein the three-dimensional surface of the fairing is tangent to the cylindrical platform at the lateral extreme points.

8. A turbine engine, comprising an air-flow straightening assembly of claim 1.

9. The air-flow straightener assembly according to claim 1, wherein the three-dimensional surface is further defined by a maximum-height point with respect to the cylindrical platform on the pressure side of the structural arm and a maximum-height point with respect to the cylindrical platform on the suction side of the structural arm, and the distance between the axial positions of the lateral extreme points is $0.1c_{OGV}$ at most.

10. The air-flow straightener assembly according to claim 1, wherein the three-dimensional surface is further defined by a maximum-height point with respect to the cylindrical platform on the pressure side of the structural arm and a maximum-height point with respect to the cylindrical platform on the suction side of the structural arm, and the distance between the axial positions of the maximum-height points is $0.1c_{OGV}$ at most.

* * * * *